United States Patent
Park et al.

(10) Patent No.: US 9,342,257 B2
(45) Date of Patent: May 17, 2016

(54) COMPUTER SYSTEM HAVING MAIN MEMORY AND CONTROL METHOD THEREOF

(71) Applicant: SAMSUNG ELECTRONICS CO., LTD., Suwon-si (KR)

(72) Inventors: Young-jin Park, Incheon (KR); Ilguy Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 66 days.

(21) Appl. No.: 14/040,968

(22) Filed: Sep. 30, 2013

(65) Prior Publication Data

US 2014/0122821 A1 May 1, 2014

(30) Foreign Application Priority Data

Oct. 30, 2012 (KR) ........................ 10-2012-0121381

(51) Int. Cl.
| | |
|---|---|
| *G06F 12/00* | (2006.01) |
| *G06F 13/00* | (2006.01) |
| *G06F 3/06* | (2006.01) |
| *G06F 12/02* | (2006.01) |
| *G06F 21/79* | (2013.01) |

(52) U.S. Cl.
CPC ............ *G06F 3/0652* (2013.01); *G06F 3/0608* (2013.01); *G06F 3/0671* (2013.01); *G06F 12/0238* (2013.01); *G06F 21/79* (2013.01); *G06F 2212/2024* (2013.01); *G06F 2212/7201* (2013.01); *G06F 2221/2143* (2013.01)

(58) Field of Classification Search
None
See application file for complete search history.

(56) References Cited

U.S. PATENT DOCUMENTS

| | | | |
|---|---|---|---|
| 6,178,132 B1* | 1/2001 | Chen et al. | 365/230.02 |
| 7,269,708 B2* | 9/2007 | Ware | 711/203 |
| 8,638,585 B2* | 1/2014 | Lee et al. | 365/51 |
| 8,769,189 B2* | 7/2014 | Li et al. | 711/103 |
| 2005/0144358 A1 | 6/2005 | Conley et al. | |
| 2006/0026340 A1* | 2/2006 | Ito et al. | 711/103 |
| 2009/0125668 A1 | 5/2009 | Huhne | |
| 2011/0145485 A1 | 6/2011 | Chun et al. | |
| 2012/0215965 A1* | 8/2012 | Inada et al. | 711/103 |
| 2012/0290772 A1* | 11/2012 | Asano et al. | 711/103 |

FOREIGN PATENT DOCUMENTS

| | | |
|---|---|---|
| KR | 10-2006-0130013 A | 12/2006 |
| KR | 10-0688463 B1 | 3/2007 |
| KR | 10-0941368 B1 | 2/2010 |
| KR | 10-2011-0066697 A | 6/2011 |
| KR | 10-1118507 B1 | 3/2012 |

* cited by examiner

*Primary Examiner* — Idriss N Alrobaye
*Assistant Examiner* — Richard B Franklin
(74) *Attorney, Agent, or Firm* — Sughrue Mion, PLLC

(57) ABSTRACT

Provided are a computer system and a method of controlling the same. The computer system includes: a central processing unit (CPU) configured to drive an application program; and a main memory configured to provide the CPU with a memory space for driving of the application program and to store a processing result of the CPU. The main memory includes: a nonvolatile memory including a first memory area configured to store data and a second memory area configured to store address information of the data; a memory controller configured to control the nonvolatile memory; and a memory manager configured to read the address information from the second memory area and delete the data stored at the first area according to the read address information, in response to a data delete command from the CPU and a control of the memory controller.

19 Claims, 9 Drawing Sheets

| Data Type | API Library |
|---|---|
| Dint | SDF |
| Dstring | |
| Dfunction | |

COMPUTER SYSTEM HAVING MAIN MEMORY AND CONTROL METHOD THEREOF

CROSS-REFERENCE TO RELATED APPLICATIONS

This application claims priority under 35 U.S.C. §119 from Korean Patent Application No. 10-2012-0121381, filed Oct. 30, 2012 in the Korean Intellectual Property Office, the entire contents of which are hereby incorporated by reference.

BACKGROUND

Apparatuses and methods consistent with exemplary embodiments relate to a computer system, and more particularly, relate to a computer system using a nonvolatile memory as a main memory and a control method of the computer system.

As a device for storing information, a semiconductor memory device may be volatile or nonvolatile. A computer system may use a dynamic random access memory (DRAM) with a fast data processing speed as a main memory and a hard disk drive or a nonvolatile memory (e.g., a flash memory) as an auxiliary storage device. An operating system program or application programs may be stored at the auxiliary storage device having a nonvolatile memory, and may be loaded onto the main memory at execution.

As a new memory field is developed, there may be attempts at replacing the DRAM with a nonvolatile memory as the main memory. In the event that the nonvolatile memory is used as the main memory, data may exist at the main memory after a computer system is powered off. In this case, information at the main memory may be leaked by hacking, so that the computer system is prone to security threats. Therefore, a technique for improving the security level of the computer system using a nonvolatile memory as a main memory would be beneficial.

SUMMARY

According to an aspect of an exemplary embodiment, there is provided a computer system including: a central processing unit (CPU) configured to drive an application program; and a main memory configured to provide the CPU with a memory space for driving of the application program and to store a processing result of the CPU. The main memory includes: a nonvolatile memory including a first memory area configured to store data and a second memory area configured to store address information of the data; a memory controller configured to control the nonvolatile memory; and a memory manager configured to read the address information from the second memory area and delete the data stored at the first area according to the read address information, in response to a data delete command from the CPU and a control of the memory controller.

The nonvolatile memory may be a spin transfer torque magneto resistive random access memory (STT-MRAM), a phase change random access memory (PRAM), or a resistive random access memory (RRAM).

The memory manager may be embedded in the memory controller.

The memory manager may read the address information in response to the data delete command and may delete the address information from the second memory area.

The computer system may further include a storage configured to store the application program, wherein the storage may be a hard disk drive or a solid state drive.

When the CPU drives the application program, at least a part of the application program may be read from the storage to be loaded onto the nonvolatile memory.

The data delete command may be defined by a data type function being an integer delete function, a string delete function, or a range delete function.

The data delete command may be defined by an application program interface function.

The data delete command may be executed after a driving of the application program is ended.

The address information may be stored at a global descriptor table included in the second area.

Data stored at the first memory area may be deleted at an idle period of time being an idle state of the CPU.

According to an aspect of another exemplary embodiment, there is provided a method of controlling a computer system including a main memory, the method including: receiving a data delete command; reading address information of data from a first area of the main memory in response to the received data delete command; and deleting data stored at a second area of the main memory according to the read address information, wherein the main memory includes a nonvolatile memory and the nonvolatile memory includes the first area and the second area.

The method may further include deleting the address information from the first area after the address information is read.

The nonvolatile memory may be an STT-MRAM, a PRAM, or an RRAM.

The deleting the data stored at the second area of the main memory may be executed at an idle period of time being an idle state of a CPU in the computer system.

According to an aspect of another exemplary embodiment, there is provided a main memory for a computer system, the main memory including: a nonvolatile memory including a first memory area configured to store data and a second memory area configured to store address information of the stored data; and a memory manager configured to read the address information from the second memory area and to delete the data stored at the first area according to the read address information, in response to a data delete command.

According to aspects of one or more exemplary embodiments, a data storage area of a main memory of a computer system may be directly deleted by a delete command. Also, an operating speed of the computer system may be improved.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION OF EXEMPLARY EMBODIMENTS

Figure 1:
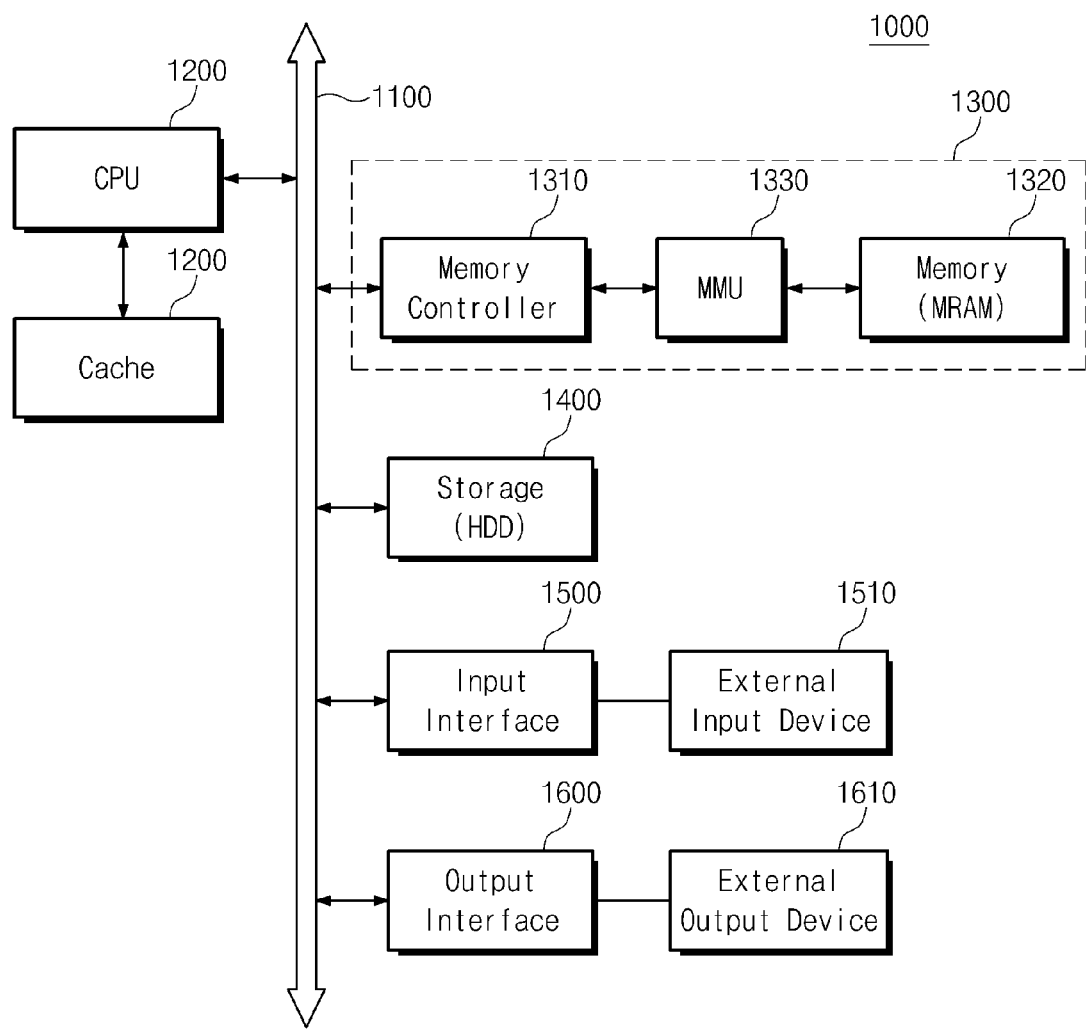
FIG. 1 is a block diagram schematically illustrating a computer system according to an exemplary embodiment.

Exemplary embodiments will be described in detail with reference to the accompanying drawings. Exemplary embodiments, however, may be embodied in various different forms, and should not be construed as being limited only to the described exemplary embodiments. Rather, these exemplary embodiments are provided as examples so that this disclosure will be thorough and complete, and will fully convey the concept of the inventive concept to those skilled in the art. Accordingly, known processes, elements, and techniques are not described with respect to some of the exemplary embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of exemplary embodiments.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a computer system 1000 according to an exemplary embodiment.

Referring to FIG. 1, a computer system 1000 may include a central processing unit (CPU) 1200, a main memory 1300, a storage 1400, an input interface 1500, and an output interface 1600 which are electrically connected with a system bus 1100. The computer system 1000 may further include a cache memory 1210 connected with the CPU 1200. The computer system 1000 may be a mobile device, a personal computer, a server computer, or a general purpose or specific purpose computer system such as a programmable home appliance, a main frame computer, and so on.

The main memory 1300 may include nonvolatile memories. The term "memory" may indicate a medium which the computer system 100 uses to store data in the short term and temporarily. The main memory 1300 may store a file system type of data, and may store an operating system program at a separate read-only space.

When the CPU 1200 drives an application program, at least a part of the application program may be read from the storage 1400, and the read data may be loaded onto a nonvolatile memory.

In one or more exemplary embodiments, the main memory 1300 may include a memory device 1320 to store data, a memory controller 1310 to control the memory device 1320, and a memory management unit 1330 (e.g., memory manager) to translate a logical address of data into a physical address in response to a command from the memory controller 1310. The memory management unit 1330 may be provided separately from the memory controller 1310, as shown in FIG. 1, although it is understood that one or more other exemplary embodiments are not limited thereto. For example, the memory management unit 1330 may be included as a part of the memory controller 1310.

The storage 1400 may be implemented as a hard disk drive (hereinafter, referred to as HDD) or a solid state drive (hereinafter, referred to as SSD). The term "storage" may indicate a storage medium which the computer system 1000 uses to store user data in the long term. An operating system, an application program, program data, and so on may be stored at the storage 1400.

The input interface 1500 may be connected with an external input device 1510. In one or more exemplary embodiments, the external input device 1510 may include a keyboard, a mouse, a microphone, a scanner, etc. A user may input a command, data, and information through the external input device 1510.

The output interface 1600 may be connected with an external output device 1610. In one or more exemplary embodiments, the external output device 1610 may be a monitor, a printer, a speaker, etc. A processing result of the computer system 1000 on a user command may be expressed through the external output device 1610. In the case of a tablet type of personal computer system, a touch screen panel and a monitor may be combined.

The computer system 1000 may further include an application chipset, a camera image processor (CIS), a modem, etc.

Figure 2:
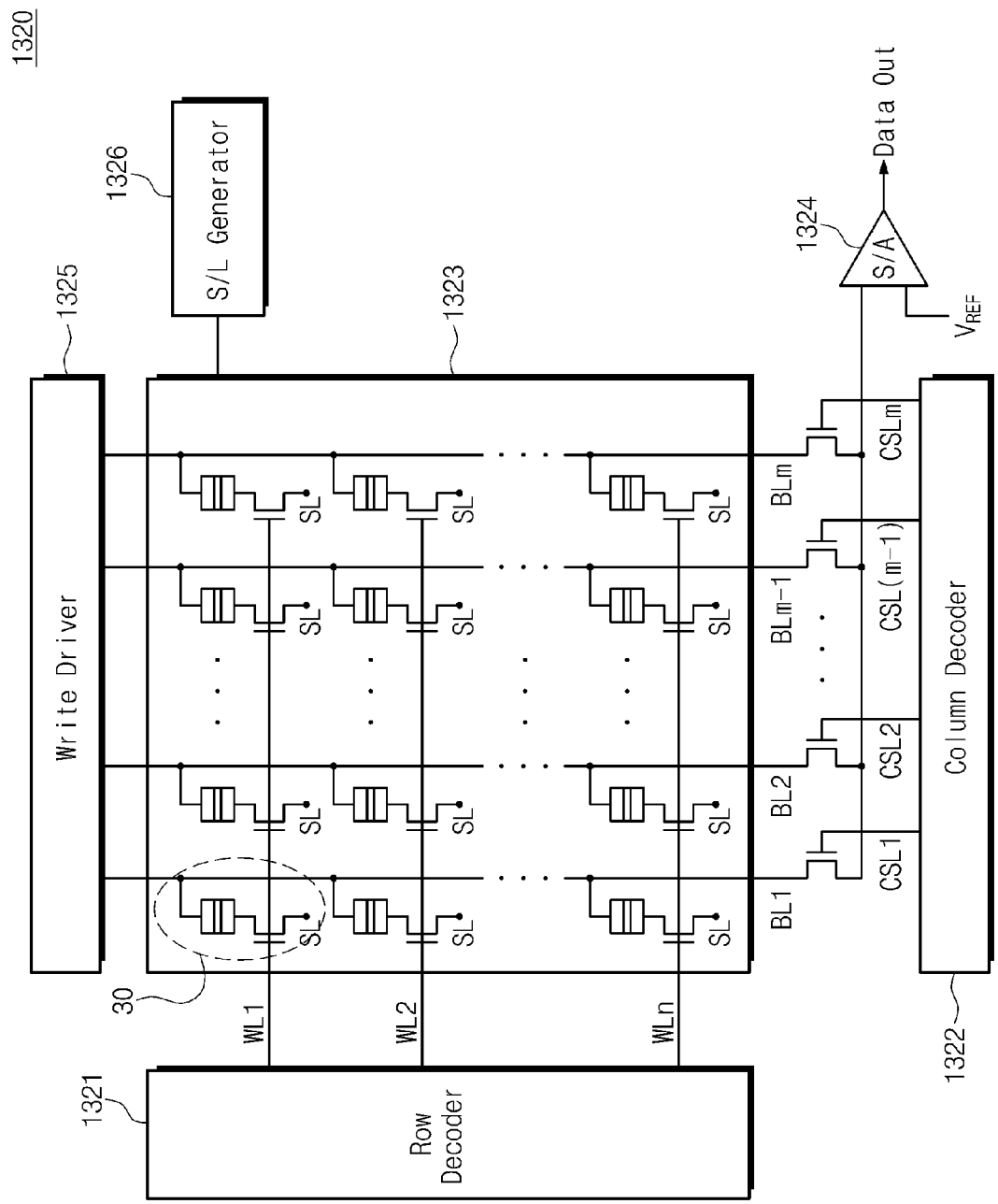
FIG. 2 is a block diagram schematically illustrating a memory device of FIG. 1.

FIG. 2 is a block diagram schematically illustrating a memory device 1320 of FIG. 1.

Referring to FIG. 2, a memory device 1320 may include a row decoder 1321, a column decoder 1322, a cell array 1323, a sense amplifier 1324, a write driver 1325, and a source voltage generator 1326.

The cell array 1323 may include a plurality of word lines WL1 to WLn (n being a natural number more than 1), a plurality of bit lines BL1 to BLm (n being a natural number more than 1), and a plurality of memory cells 30 arranged at intersections of the word lines WL1 to WLn and the bit lines BL0 to BLm. If each memory cell is formed of (e.g., includes) a spin transfer torque magneto resistive random access memory (STT-MRAM) cell, the memory cell may include a cell transistor and a magnetic tunnel junction (MTJ) element having a magnetic material.

The MTJ elements may be replaced with a resistive element such as a phase change random access memory (PRAM) using a phase change material, a resistive random access memory (RRAM) using a variable resistance material (e.g., complex metal oxide), or a magnetic random access memory (MRAM) using a ferromagnetic material. Resistance values of materials for resistive elements may vary a current/voltage level or direction, and may be maintained even at power-off.

Each of the row and column decoders 1321 and 1322 may include a plurality of switches. The row decoder 1321 may select a word line in response to a row address. The column decoder 1322 may generate column selection signals CSL1 to CSLm to select one bit line. The bit lines BL1 to BLm may be connected with the write driver 1325. The write driver 1325 may apply a current for a write operation to the cell array 1323 in response to an external command.

At a data read operation, a voltage on a bit line may vary according to a resistance value of the memory cell 30. A bit line voltage may be transferred to the sense amplifier 1324, and the sense amplifier 1324 may compare the bit line voltage with a reference voltage VREF to output a data signal.

Figure 3:
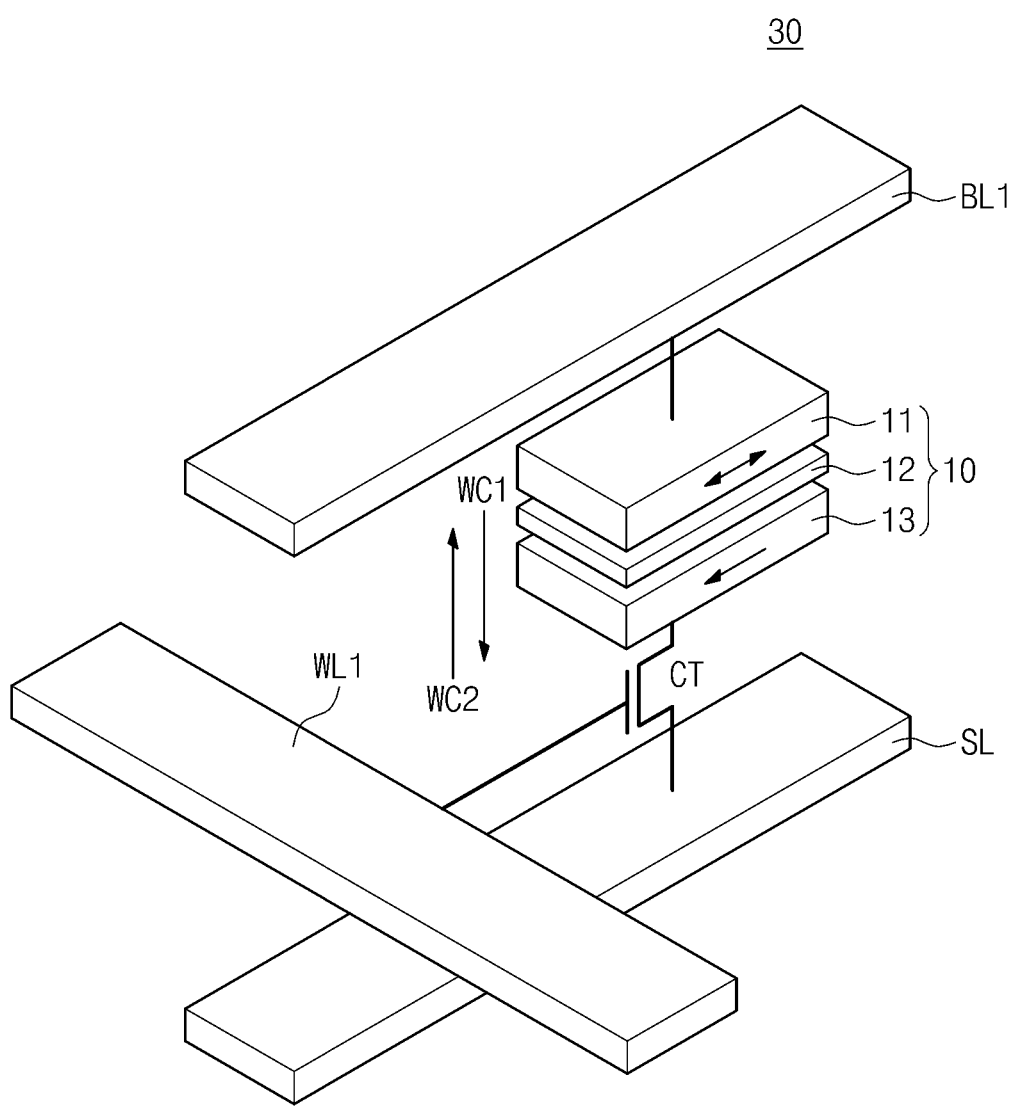
FIG. 3 is a perspective view of a spin transfer torque magneto resistive random access memory (STT-MRAM) cell as a nonvolatile memory cell of FIG. 2.

FIG. 3 is a perspective view of an STT-MRAM cell as a nonvolatile memory cell 30 of FIG. 2. Referring to FIG. 3, a memory cell 30 may include an MTJ element 10 and a cell transistor CT. A gate of the cell transistor CT may be connected with a word line (e.g., WL1). One electrode of the cell transistor CT may be connected with a bit line (e.g., BL1) through the MTJ element 10, and the other electrode thereof may be connected with a source line SL.

The MTJ element 10 may include a pinned layer 13, a free layer 11, and a tunnel layer 12 interposed between the pinned layer 13 and the free layer 11. A magnetization direction of the pinned layer 13 may be fixed, while a magnetization direction of the free layer 11 may be equal or opposite to that of the pinned layer 13 according to a condition. An anti-ferromagnetic layer may be further provided to fix a magnetization direction of the pinned layer 13.

The STT-MRAM cell 30 may be written by applying a logic high voltage to the word line WL1 to turn the cell transistor CT on and a write current WC1/WC2 between the bit line BL1 and the source line SL.

The STT-MRAM cell 30 may be read by applying a logic high voltage to the word line WL1 to turn the cell transistor CT on and a read current in a direction from the bit line BL1 to the source line SL. At this time, data stored at the MTJ element 10 may be determined according to a measured resistance value.

Figure 4:
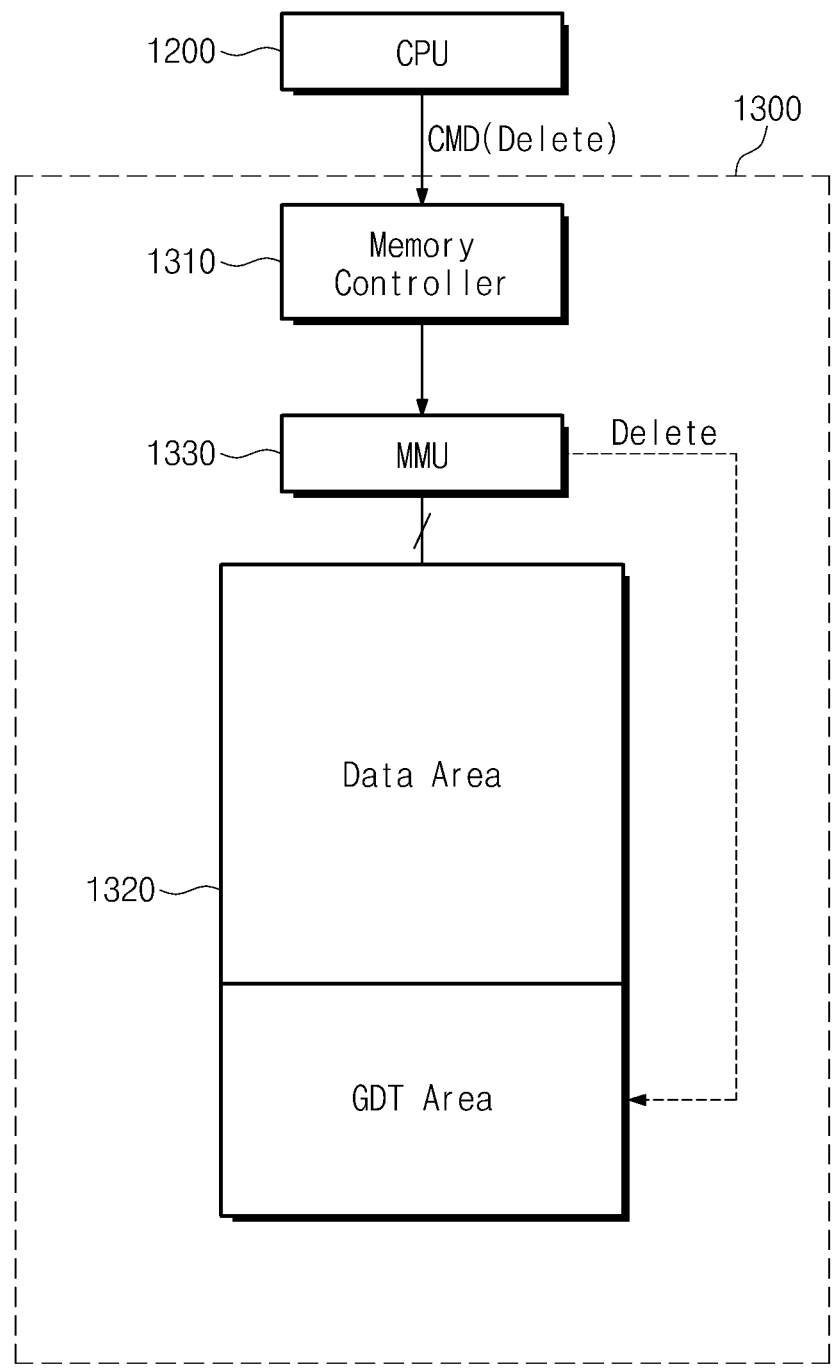
FIG. 4 is a diagram illustrating a related art method in which a computer system deletes data in response to a data delete command on a main memory.

FIG. 4 is a diagram illustrating a related art method in which a computer system deletes data in response to a data delete command on a main memory. Referring to FIG. 4, a computer system may include a CPU 1200 and a main memory 1300. The main memory 1300 may include a memory controller 1310, a memory management unit 1330, and a memory device 1320. The memory device 1320 may be a nonvolatile memory device.

The memory device 1320 may be an STT-MRAM, a PRAM, or an RRAM.

The memory device 1320 may include a data area in which data is stored and a global descriptor table (GDT) area in which address information of stored data is stored.

A delete command on data stored at the main memory 1300 may be transferred from the CPU 1200. The delete command may be sent to the memory controller 1310, and the memory controller 1310 may control a delete operation of the memory device 1320 using the memory management unit 1330. In the general computer system, the memory controller 1310 may delete address information stored at the GDT area only in response to the delete command.

The main memory 1300 may not perform a delete operation (or, an erase operation) on the data area in response to the delete command. That is, the main memory 1300 may define the data area, in which data to be deleted is stored, as an empty space by deleting address information of the GDT area. Afterwards, the main memory 1300 may overwrite the data area, in which the data to be deleted is stored, with new data. That is, it is possible to delete data without a separate delete operation corresponding to the delete command.

With the above-described computer system, although a delete command is executed, data may substantially exist at the data area. Thus, as data deleted is leaked by hacking, a security level may be lowered.

Figure 5:
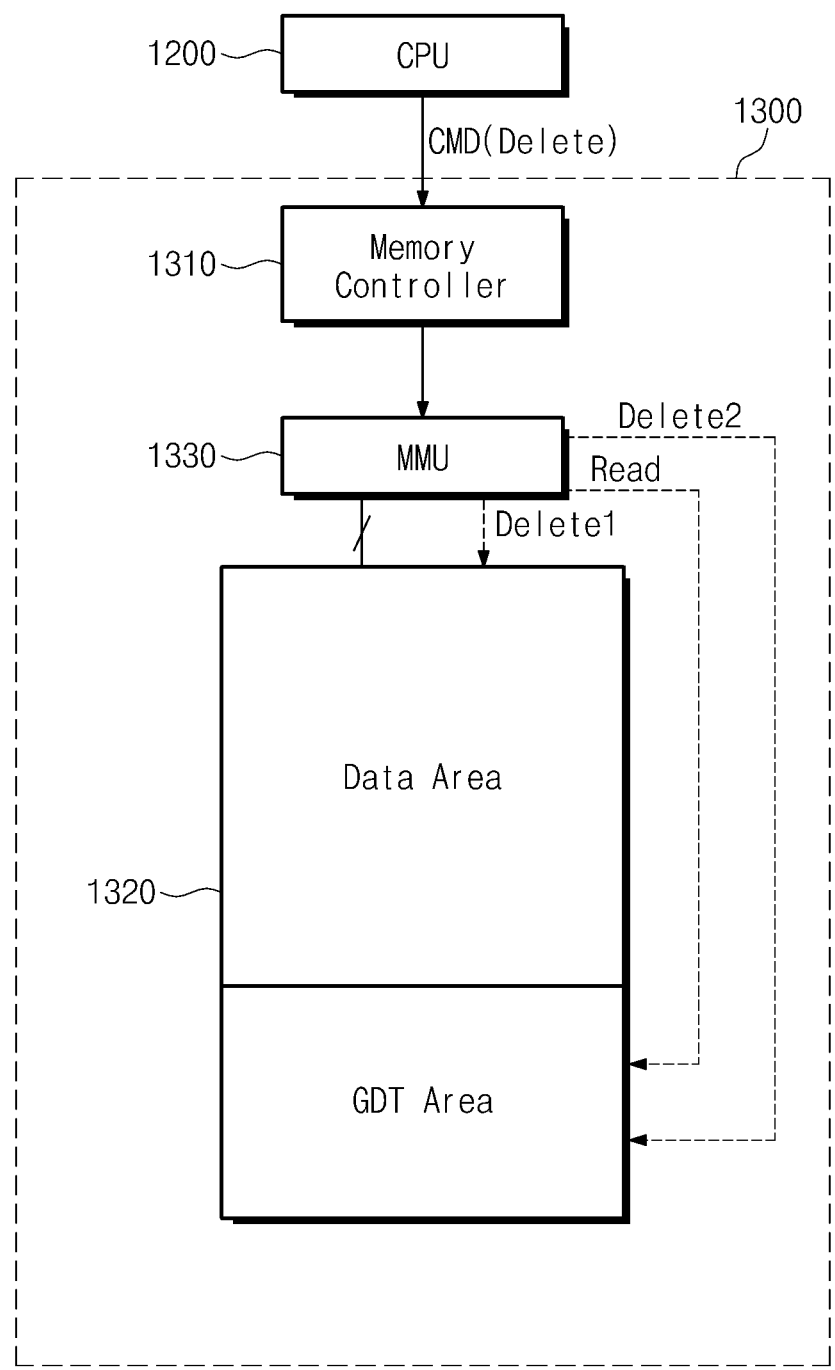
FIG. 5 is a diagram illustrating a method in which a computer system according to an exemplary embodiment directly deletes a data area of a main memory in response to a data delete command.

FIG. 5 is a diagram illustrating a method in which a computer system according to an exemplary embodiment directly deletes a data area of a main memory in response to a data delete command. Referring to FIG. 5, a computer system may include a CPU 1200 and a main memory 1300. The main memory 1300 may include a memory controller 1310, a memory management unit 1330, and a memory device 1320. The memory device 1320 may be a nonvolatile memory device.

In one or more exemplary embodiments, the memory device 1320 may be an STT-MRAM, a PRAM, or an RRAM.

In one or more exemplary embodiments, the memory device 1320 may include a data area in which data is stored and a global descriptor table (GDT) area in which address information of stored data is stored.

A delete command on data stored at the main memory 1300 may be transferred from the CPU 1200. The memory controller 1310 may control a delete operation of the memory device 1320 using the memory management unit 1330.

The memory management unit 1330 may read address information of data to be deleted from the GDT area in response to the delete command transferred through the memory controller 1310. The read address information may include physical address information of data to be deleted. Herein, the physical address information of data to be deleted may indicate a physical location where data to be deleted of the data area of the memory device 1320 is stored.

The memory management unit 1330 may delete the data area corresponding to the data to be deleted according to the physical address information. In one or more exemplary embodiments, the memory management unit 1330 may perform a delete operation by erasing memory cells or a physical page of the data area where the data to be deleted is stored.

The memory management unit 1330 may delete address information of the data deleted from the GDT area such that a space where the deleted data was stored is defined as an empty space. In one or more exemplary embodiments, deleting of the address information may be executed before and after deleting of the data area where the data to be deleted is stored.

In one or more exemplary embodiments, a delete operation on the data area may be performed during an idle period of time. If the delete operation is performed at the idle period of time, such a phenomenon that an operation is delayed by the delete operation of the main memory 1300 may be reduced. Thus, an operating speed of the computer system may be improved.

As described above, data stored at the memory device 1320 may be physically deleted in response to a delete command of the CPU 1200. Since deleted data does not remain at the memory device 1320, the deleted data may be prevented from be leaked through hacking. Also, since the delete operation is performed during the idle period of time, a delay of a processing speed due to the delete operation may be minimized. Thus, an operating speed of the computer system may be improved.

Figure 6:
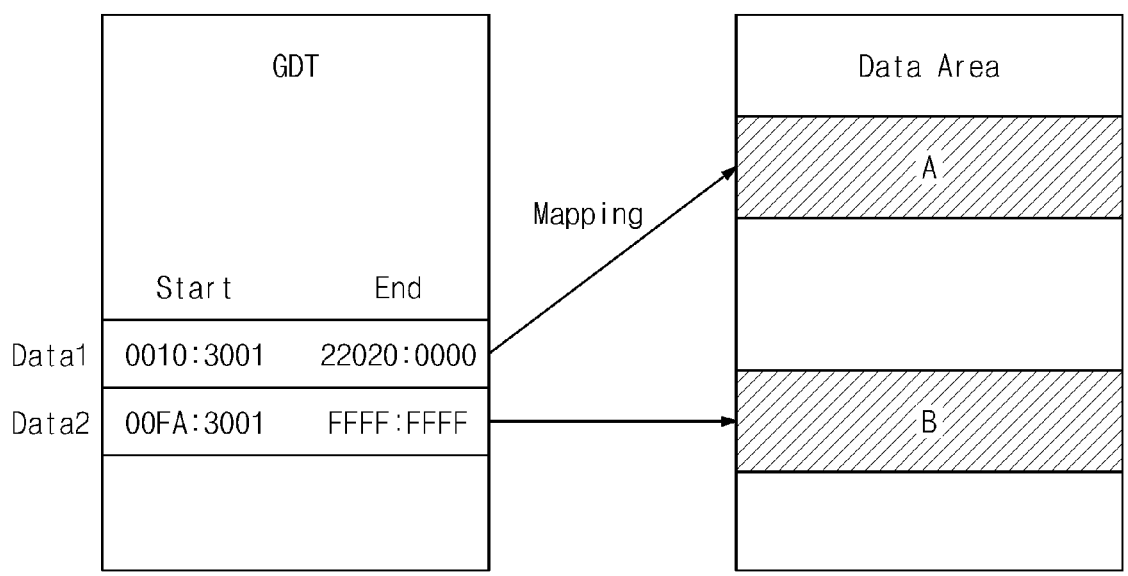
FIG. 6 is a diagram schematically illustrating an address mapping method of a memory management unit according to an exemplary embodiment.

FIG. 6 is a diagram schematically illustrating an address mapping method of a memory management unit 1330 according to an exemplary embodiment. Referring to FIG. 6, a global descriptor table (GDT) may include physical addresses of data stored at a data area of a memory device 1320 (refer to FIG. 5).

The memory management unit 1330 may read address information of data to be deleted from the GDT in response to a delete command. In one or more exemplary embodiments, address information stored at the GDT may include a start location and an end location of the data to be deleted. The memory management unit 1330 may calculate a physical address of the data to be deleted from address information read through mapping. The memory management unit 1330 may delete the data to be deleted from the data area by controlling the memory device 1320 such that memory cells or a memory page corresponding to the calculated physical address is erased.

For example, the memory management unit 1330 may read address information of first data Data1 from the GDT in response to a delete command of the first data Data1, and may erase a memory area A corresponding to the read address information.

Alternatively, the memory management unit 1330 may read address information of second data Data2 from the GDT in response to a delete command of the second data Data2, and may erase a memory area B corresponding to the read address information.

Figures 7, 8:
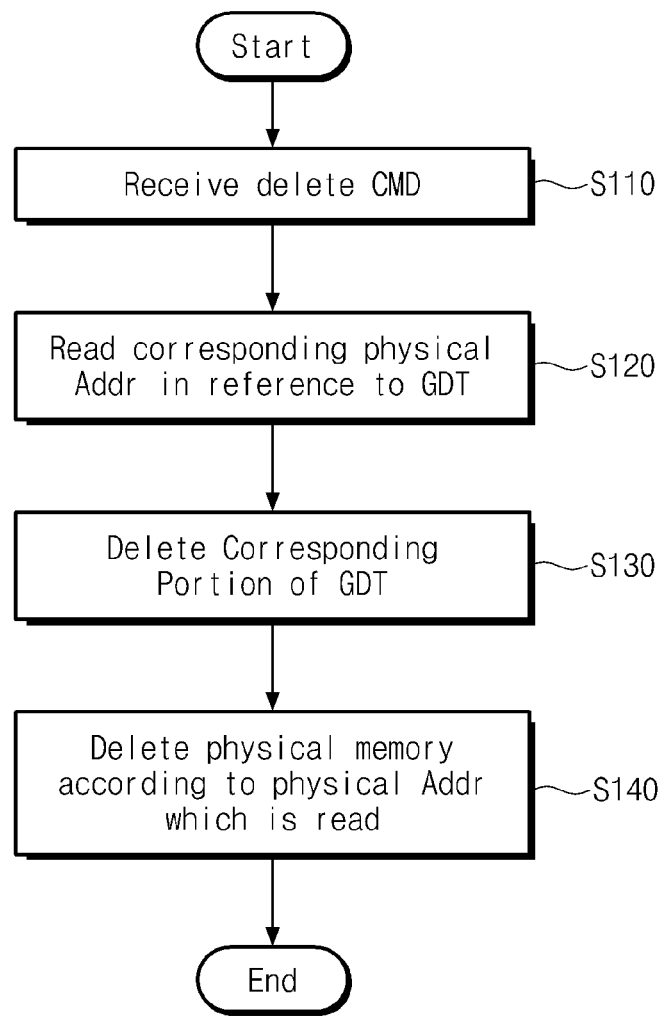
FIG. 7 is a diagram illustrating various types of delete commands of a computer system according to an exemplary embodiment.
FIG. 8 is a flow chart illustrating a control method of a computer system according to an exemplary embodiment.

FIG. 7 is a diagram illustrating various types of delete commands of a computer system according to an exemplary embodiment. Referring to FIG. 7, a delete command may be defined by a data type function or an application program interface (API) function.

In the event that the delete command is defined by the data type function, a defined data type function may be an integer delete function Dint, a string delete function Dstring, or a range delete function Dfunction. Herein, the integer delete function Dint may be a function for deleting data by an integer unit. The string delete function Dstring may be a function for deleting data by a string unit. The range delete function Dfunction may be a function for deleting data by a unit of a corresponding logical address range. The data type function may be implemented by a function which program development languages (e.g., C++, Visual Studio, Java, etc.) support. In the event that the delete command is defined by the data type function, it may be executed during a time when an application program loaded onto a main memory 1300 (refer to FIG. 1) is driven by a CPU 1200.

If the delete command is defined by the API function, data belonging to a logical address designated by the API function may be erased in a lump by the delete command. If the delete command is defined by the API function, the delete command may not be executed during a time when an application program loaded onto the main memory 1300 is driven. In this case, the delete command may be performed after driving of the application program is ended.

FIG. 8 is a flow chart illustrating a control method of a computer system according to an exemplary embodiment.

Referring to FIG. 8, in operation S110, a main memory 1300 (refer to FIG. 1) may receive a delete command (or, a data delete command) from a CPU 1200 (refer to FIG. 1). The input delete command may be sent to a memory controller 1310 (refer to FIG. 1).

In operation S120, the memory controller 1310 may read address information of data to be deleted from a first area of a memory device 1320 (refer to FIG. 1) using a memory management unit 1330 (refer to FIG. 1). In one or more exemplary embodiments, the first area may include a global descriptor table (GDT) of data stored at the main memory 1300. The memory management unit 1330 may read address information of data to be deleted from the GDT in response to the delete command transferred via the memory controller 1310. The read address information may include physical address information of a second area of the memory device 1320 where the data to be deleted is stored.

In operation S130, the memory management unit 1330 may read address information of the data to be deleted to delete address information stored at the first area.

In operation S140, the memory management unit 1330 may calculate a physical address of the data to be deleted based on the read address information. The memory management unit 1330 may delete the data to be deleted stored at the second area according to the calculated physical address. Herein, that the data to be deleted is deleted may indicate that a physical memory (memory cells or a physical page) where the data to be deleted is stored is erased or deleted.

Herein, an operation of deleting data to be deleted according to a physical address may be the same as described above or similar thereto.

In one or more exemplary embodiments, the above-described delete operation may be executed during an idle period of time being an idle state of the CPU 1200 in the computer system.

In one or more exemplary embodiments, the memory device 1320 may include a nonvolatile memory, which includes the first area and the second area. Also, the nonvolatile memory may be an STT-MRAM, a PRAM, or an RRAM.

As described above, data stored at the memory device 1320 may be physically deleted in response to a delete command of the CPU 1200. Since deleted data does not remain at the memory device 1320, the deleted data may be prevented from be leaked through hacking. Also, since the delete operation is performed during the idle period of time, a delay of a processing speed due to the delete operation may be minimized. Thus, an operating speed of the computer system may be improved.

Figure 9:
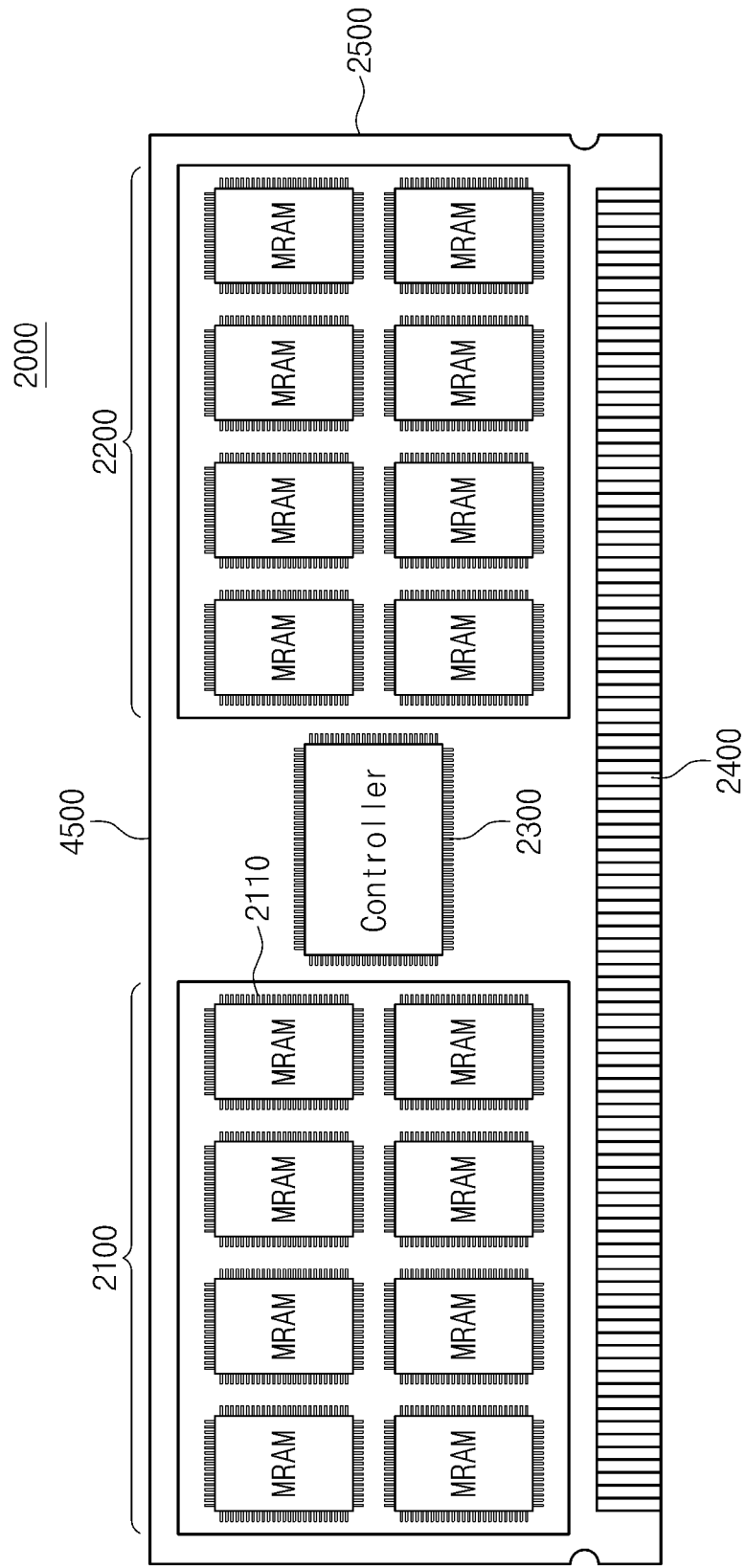
FIG. 9 is a block diagram schematically illustrating a memory module according to an exemplary embodiment.

FIG. 9 is a block diagram schematically illustrating a memory module 2000 according to an exemplary embodiment. Referring to FIG. 9, a memory module 2000 may include MRAM chips 2110, a controller 2300, a connector 2400, and a printed circuit board 2500.

The MRAM chips 2110 may be disposed on one side 2100 or both sides 2100 and 2200 of the controller 2300. The MRAM chips 2110 may be disposed on front and rear surfaces of the printed circuit board 2500.

The connector 2400 may be electrically connected with the MRAM chips 2110 via conductive lines. The connector 2400 may be electrically inserted in a slot of a main board of a computer system.

The controller 2300 may control data write and delete operations of MRAM cells of the MRAM chips 21100. The controller 2300 may be formed of a separate chip on the printed circuit board 2500 or provided in the MRAM chips 2110. Alternatively, the controller 2300 may be disposed outside the memory module 2000.

Data areas of the MRAM chips 2110 may be directly deleted in response to a delete command from the controller 2300. This may be performed substantially the same as described above. Also, when the data areas of the MRAM chips 2110 are deleted, the delete operation may be executed during an idle time to improve an operating speed of the computer system.

Figure 10:
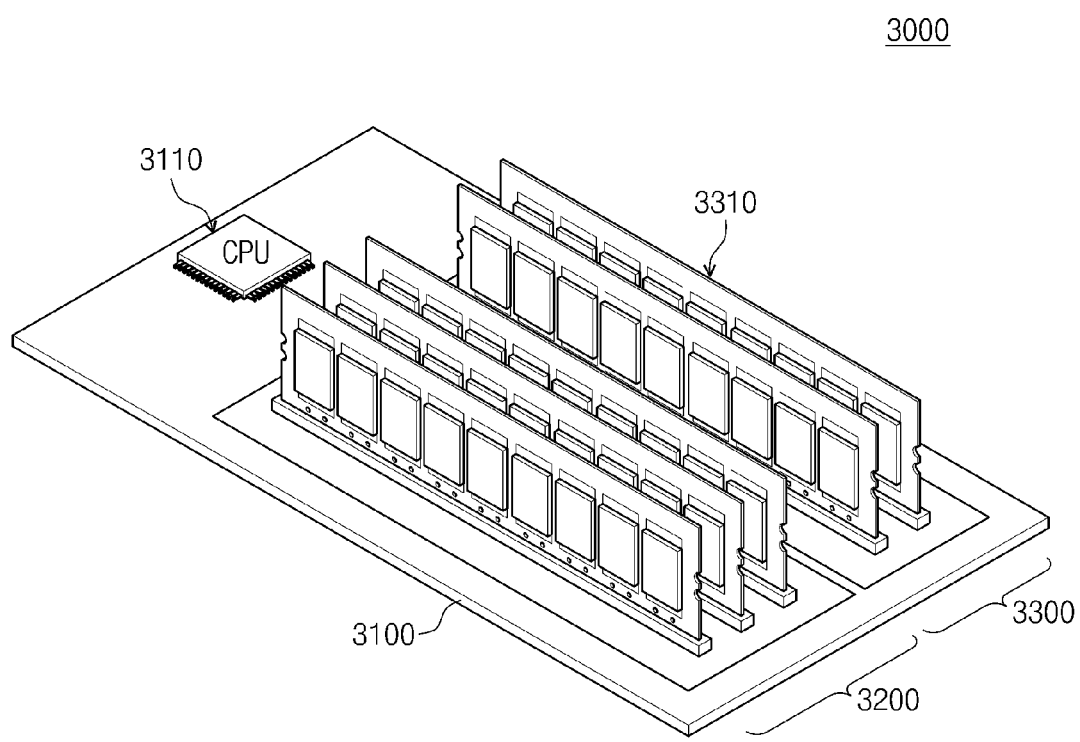
FIG. 10 is a diagram schematically illustrating a main board and a plurality of memory modules according to an exemplary embodiment.

FIG. 10 is a diagram schematically illustrating a main board 3100 and a plurality of memory modules 3310 according to an exemplary embodiment. Referring to FIG. 10, a main board 3100 may be a substrate for installing basic parts of a computer system 3000. A plurality of memory modules 3310 may be mounted at the main board 3100.

The plurality of memory modules 3310 may be inserted in slots to be connected with the main board 3100. The plurality of memory modules 3310 may be divided into a plurality of areas 3200 and 3300.

Various parts, devices, components, etc., including a CPU 3110 and the memory modules 3310, may be mounted at the main board 3100. Also, a circuit pattern for connecting a plurality of parts may be formed (e.g., included) at the main board 3100.

A data area of the memory module 3310 may be directly deleted in response to a delete command from the CPU 3110. For example, the plurality of memory modules 3310 may delete data areas of MRAM chips therein in response to the delete command. This may be performed substantially the same as described above. Also, when the memory modules 3310 delete data areas of MRAM chips, the delete operation may be executed during an idle time to improve an operating speed of the computer system.

While exemplary embodiments have been described above, it will be apparent to those skilled in the art that various changes and modifications may be made without departing from the spirit and scope of the present inventive concept. Therefore, it should be understood that the above exemplary embodiments are not limiting, but illustrative.

What is claimed is:

1. A computer system comprising:
   a central processing unit (CPU) configured to drive an application program; and
   a main memory configured to provide the CPU with a memory space for driving of the application program and to store a processing result of the CPU,
   wherein the main memory comprises:
      a nonvolatile memory including a first memory area configured to store data and a second memory area configured to store address information of the stored data;
      a memory controller configured to control the nonvolatile memory; and
      a memory manager configured to read the address information from the second memory area and to delete the data stored at the first area according to the read address information, in response to a data delete command from the CPU and a control of the memory controller,
   wherein the memory manager is configured to read the address information and to delete the address information from the second memory area in response to the data delete command, and
   wherein the memory manager is configured to read, from the second memory area, a start location and an end location of the stored data to be deleted.

2. The computer system of claim 1, wherein the nonvolatile memory is a spin transfer torque magneto resistive random access memory (STT-MRAM), a phase change random access memory (PRAM), or a resistive random access memory (RRAM).

3. The computer system of claim 1, wherein the memory manager is embedded in the memory controller.

4. The computer system of claim 1, further comprising:
   a storage configured to store the application program,
   wherein the storage is a hard disk drive or a solid state drive.

5. The computer system of claim 4, wherein when the CPU drives the application program, at least a part of the application program is read from the storage and loaded onto the nonvolatile memory.

6. The computer system of claim 1, wherein the data delete command is defined by a data type function being an integer delete function, a string delete function, or a range delete function.

7. The computer system of claim 1, wherein the data delete command is defined by an application program interface function.

8. The computer system of claim 7, wherein the data delete command is executed after a driving of the application program ends.

9. The computer system of claim 1, wherein the address information is stored at a global descriptor table included in the second area.

10. The computer system of claim 1, wherein the data stored at the first memory area is deleted at an idle period of time being an idle state of the CPU.

11. The computer system of claim 1, wherein the memory manager is configured to calculate a physical address of the stored data to be deleted based on the read start location and the read end location.

12. The computer system of claim 1, wherein the memory manager is configured to delete the address information from the second memory area before deleting the data from the first memory area.

13. A method of controlling a computer system including a main memory, the method comprising:
receiving a data delete command;
reading address information of data from a first area of the main memory in response to the received data delete command;
deleting the data stored at a second area of the main memory according to the read address information;
deleting the address information from the first area after the address information is read,
wherein the main memory includes a nonvolatile memory and the nonvolatile memory includes the first area and the second area, and
wherein the reading the address information comprises reading, from the first area, a start location and an end location of the stored data to be deleted.

14. The method of claim 13, wherein the nonvolatile memory is a spin transfer torque magneto resistive random access memory (STT-MRAM), a phase change random access memory (PRAM), or a resistive random access memory (RRAM).

15. The method of claim 13, wherein the deleting the data stored at the second area of the main memory comprises deleting the data stored at the second area at an idle period of time being an idle state of a central processing unit (CPU) in the computer system.

16. A main memory for a computer system, the main memory comprising:
a nonvolatile memory including a first memory area configured to store data and a second memory area configured to store address information of the stored data; and
a memory manager configured to read the address information from the second memory area and to delete the data stored at the first area according to the read address information, in response to a data delete command,
wherein the memory manager is configured to read the address information and to delete the address information from the second memory area in response to the data delete command, and
wherein the memory manager is configured to read, from the second memory area, a start location and an end location of the stored data to be deleted.

17. The main memory of claim 16, wherein the nonvolatile memory is a spin transfer torque magneto resistive random access memory (STT-MRAM), a phase change random access memory (PRAM), or a resistive random access memory (RRAM).

18. The main memory of claim 16, wherein the nonvolatile memory is configured to provide a memory space for driving an application program and to store a processing result, and is distinct from a storage which stores the application program.

19. The main memory of claim 16, wherein the data stored at the first memory area is deleted at an idle period of time being an idle state of a central processing unit (CPU).

* * * * *